No. 852,246. PATENTED APR. 30, 1907.
J. W. SWIFT.
ADJUSTABLE TOOL POST.
APPLICATION FILED MAR. 8, 1906.
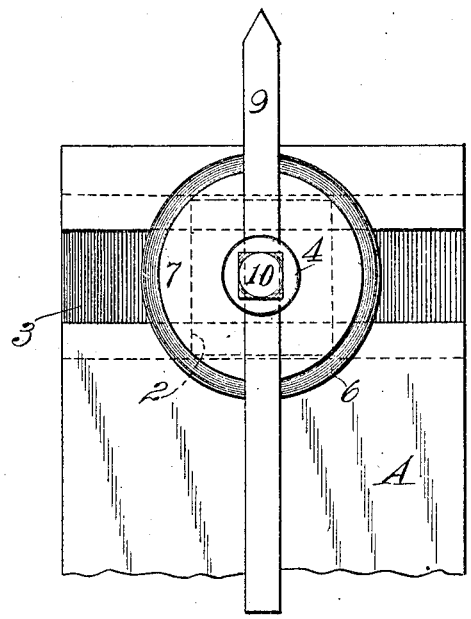
Fig. 1.
Fig. 3.
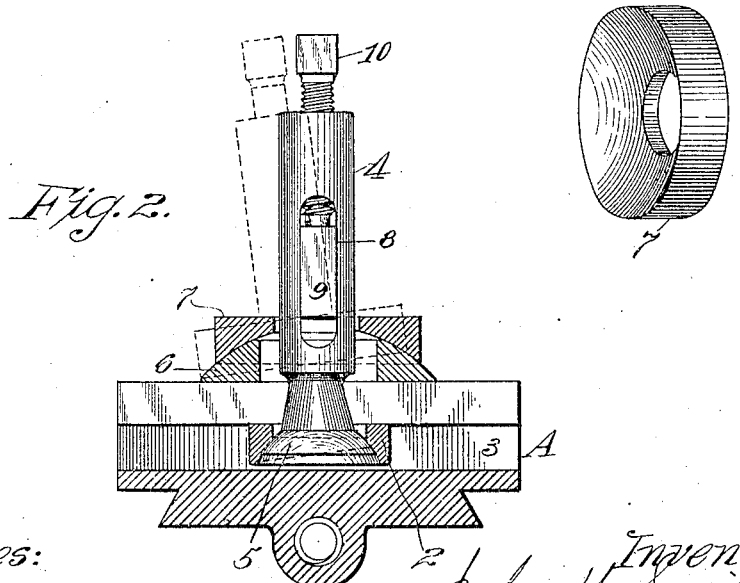
Fig. 2.
Witnesses:
F. E. Maynard.
Inventor:
John W. Swift
By Geo. H. Strong.
Atty

UNITED STATES PATENT OFFICE.

JOHN W. SWIFT, OF BERKELEY, CALIFORNIA.

ADJUSTABLE TOOL-POST.

No. 852,246.    Specification of Letters Patent.    Patented April 30, 1907.

Application filed March 8, 1906. Serial No. 304,895.

*To all whom it may concern:*

Be it known that I, JOHN W. SWIFT, a citizen of the United States, residing at Berkeley, in the county of Alameda and State of California, have invented new and useful Improvements in Adjustable Tool-Posts, of which the following is a specification.

My invention relates to tool-posts, such as are employed in conjunction with lathes and for like purposes.

It consists in the combination of parts, and in details of construction which will be more fully explained by reference to the accompanying drawings, in which—

Figure 1 is a plan view of the tool-post. Fig. 2 is an end view partially in section. Fig. 3 is a perspective of a member.

I have here shown a sufficient portion of the tool-rest A to illustrate my invention.

2 is a slide or collar movable in the slot or channel 3 of the tool-rest. This collar has a hole made through it of larger diameter than that of the upper part of the tool-post 4, and the lower surface is counterbored upon the curvature of a globe so as to receive the enlarged and similarly curved head 5 at the bottom of the tool-post which may thus serve to lock the collar within the flanges of the channel 3 of the tool-rest. I have here shown the portion of the tool-post just above the collar as being slightly reduced in size so as to leave plenty of space for the post to be turned to stand at different angles with relation to the tool-rest, and still allow the upper surface of the collar to engage the flanges of the rest when the parts are secured in place.

6 is a collar having a hole made through it of larger diameter than that of the tool-post 4 which passes through the hole and extends upwardly from the collar. The lower surface of the collar is flat so as to rest upon the upper flat surface of the tool-rest, the collar having sufficient diameter to extend a considerable distance on each side of the slot or channel of the tool-rest. The upper surface of this collar forms a globular segment. 7 is another collar, also centrally perforated to fit over the tool-post, and its lower surface forms a concave globular segment of the same radius with the upper surface of the collar 6 so that the two fit upon each other. The hole through the collar 7 is only sufficiently large to allow the tool-post to slide freely through it, but the hole through collar 6 is large enough to allow the tool-post to be tilted to one side or the other, and the collar 7 slides with it over the globular surface of 6; thus it will be seen that the tool-post may be tilted to any desired angle with relation to the tool-rest; the connections heretofore described forming a universal joint for such movements. The tool-post is slotted in the usual manner, as shown at 8 to allow the tool 9 to be passed through it, and the tool is locked in position by a set screw 10 passing through the top of the tool-post 4 in the usual manner, and as here shown.

By this construction it will be seen that as the upper collar 7 moves in unison with the tool-post, the latter will always project at right angles with the upper surface of this collar whatever may be the angle of the post with relation to the stationary support. The holding-screw consequently bears squarely upon the top of a rectangular tool, and the lower surface of the tool in like manner bears squarely upon the top of the collar 7, thus insuring a firm locking of the tool in position.

It will be seen by this construction that if it is desired to raise or lower the cutting point of the tool, it may be effected by loosening the set screw, moving the upper collar 7 over the globular surface of the collar 6 until the desired angle is attained, when the parts may be again locked together by means of the screw, and the angle of the two is thus obtained without any blocking up by independent pieces as is usually done in the ordinary construction of tool-posts.

If it is desirable to change the clearance of the tool in relation to the work upon which it is engaged, or as is necesssary in cutting screws of coarse pitch, the tool-post may be turned a little to one side or the other, the adjustment always being made between the globular contact surface of the collar 6 and 7, and by means of the similar contact surfaces between the head 5 of the tool-post, and the lower surface of the slide or collar 2; these adjustments are all compensated in the contact between these two latter parts. Thus when the parts are locked together, there is always a flat surface of contact, and a perfect and steady lock of the parts.

Having thus described my invention, what I claim and desire to secure by Letters Patent is—

The combination with a slidable and channeled tool-rest, of a rectangular slide adjustable in the channel and having an opening and enlarged concavity below, a single piece tool-post having an enlarged convex head at the lower end fitting the lower part of the slide, a collar having a flat surface of support upon the rest, and above the bottom of the post, a globular convexity above and a central opening of larger diameter than the tool-post, a second concave collar fitting and slidable upon the surface of the first named collar, a tool passing through a slot in the post and resting upon the upper collar, and a clamping screw to lock all movable parts together.

In testimony whereof I have hereunto set my hand in presence of two subscribing witnesses.

JOHN W. SWIFT.

Witnesses:
S. H. NOURSE,
D. B. RICHARDS.